(12) United States Patent
Goto

(10) Patent No.: US 6,495,480 B1
(45) Date of Patent: *Dec. 17, 2002

(54) GLASS-CERAMIC SUBSTRATE FOR AN INFORMATION STORAGE MEDIUM

(75) Inventor: Naoyuki Goto, Sagamihara (JP)

(73) Assignee: Kabushiki Kaisha Ohara, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/390,115

(22) Filed: Sep. 3, 1999

(30) Foreign Application Priority Data

| Sep. 11, 1998 | (JP) | 10-257988 |
| Aug. 27, 1999 | (JP) | 11-241346 |

(51) Int. Cl.⁷ .......................... C03C 10/14; C03C 10/04
(52) U.S. Cl. ................... 501/4; 501/5; 501/9; 501/10; 428/694 ST; 428/694 SG
(58) Field of Search ............................. 501/4, 5, 9, 10; 428/694 ST, 694 SG; 65/31, 33.1, 33.7, 33.8; 216/97

(56) References Cited

U.S. PATENT DOCUMENTS

| 3,490,888 A | | 1/1970 | Strong | |
| 4,687,749 A | | 8/1987 | Bealle | |
| 5,391,522 A | * | 2/1995 | Goto et al. | 501/4 |
| 5,476,821 A | * | 12/1995 | Beall et al. | 501/10 |
| 5,491,116 A | * | 2/1996 | Beall et al. | 501/5 |
| 5,532,194 A | * | 7/1996 | Kawashima et al. | 501/9 |
| 5,561,089 A | * | 10/1996 | Ishizaki et al. | 501/10 |
| 5,567,217 A | * | 10/1996 | Goto et al. | 501/5 |
| 5,726,108 A | * | 3/1998 | Taguchi et al. | 501/5 |
| 5,804,520 A | * | 9/1998 | Morinaga et al. | 501/4 |
| 5,972,816 A | * | 10/1999 | Goto | 501/4 |
| 6,245,411 B1 | * | 6/2001 | Goto et al. | 428/141 |
| 6,344,423 B2 | * | 2/2002 | Goto et al. | 501/4 |

FOREIGN PATENT DOCUMENTS

| EP | 0 289 943 | | 11/1988 |
| EP | 0810586 A1 | * | 12/1997 |
| EP | 0 853 071 | | 7/1998 |
| EP | 0 875 886 | | 11/1998 |
| EP | 0781731 | | 3/1999 |
| EP | 0 917 135 | | 5/1999 |
| EP | 0939396 | * | 9/1999 |
| EP | 952966 A1 | * | 11/1999 |
| GB | 2 270 412 | | 3/1994 |

* cited by examiner

Primary Examiner—Karl Group
(74) Attorney, Agent, or Firm—Hedman & Costigan, P.C.

(57) ABSTRACT

A glass-ceramic substrate for an information storage medium made of a glass-ceramics having a crystal phase dispersed in a glass matrix has a ratio of crystal phase (the amount of crystal) in the glass-ceramics is within a range from 50 wt % to 70 wt % and crystal grains having an average crystal grain diameter within a range from 0.10 μm to 0.50 μm are exposed on the surface of the substrate. The glass-ceramics substrate has Young's modulus within a range from 95 GPa to 160 GPa, specific gravity within a range from 2.40 to 2.80, and a ratio of Young's modulus to specific gravity within a range from 39 GPa to 57 GPa. The glass-ceramic substrate has a surface microstructure in which respective crystal grains present in a surface portion of the substrate are fixed to the surface portion with half or more in volume of the respective crystal grains being exposed above the surface of the glass matrix.

9 Claims, 3 Drawing Sheets

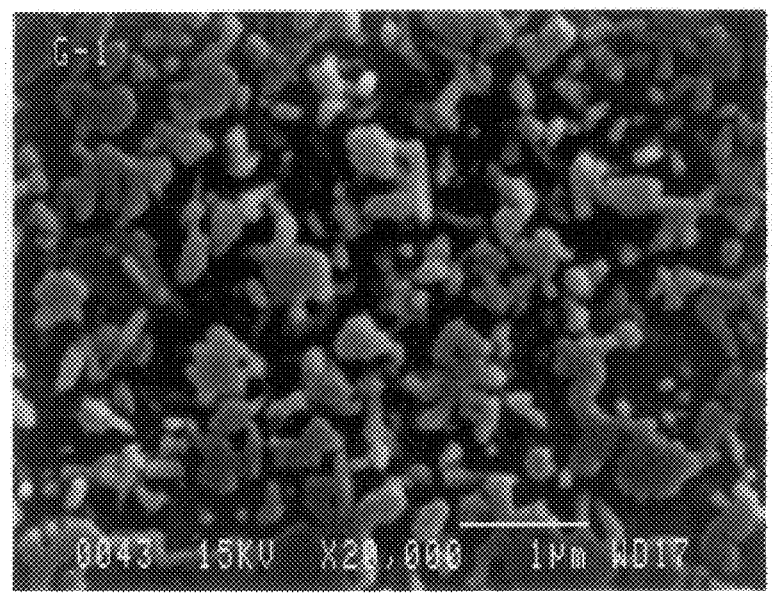
F I G. 1
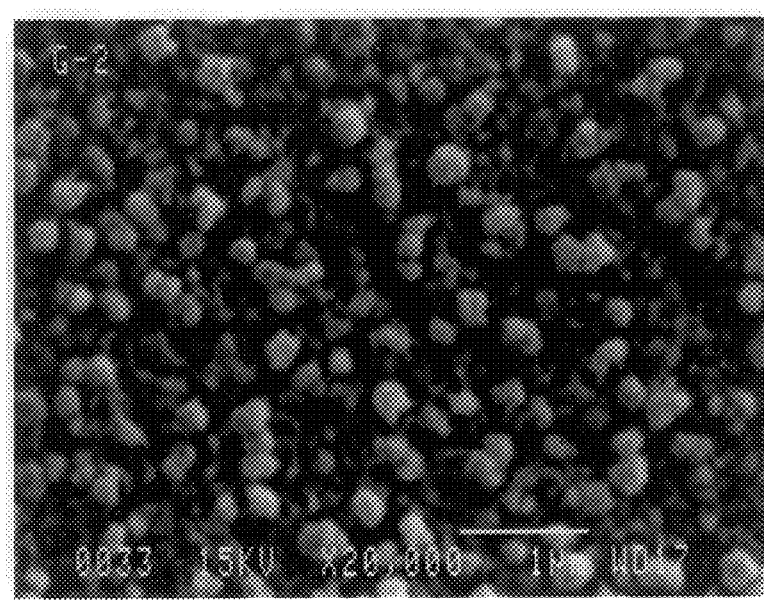
F I G. 2

GLASS-CERAMIC SUBSTRATE FOR AN INFORMATION STORAGE MEDIUM

BACKGROUND OF THE INVENTION

This invention relates to a glass-ceramic substrate for an information storage medium, a method for manufacturing the same and an information storage disk. In this specification, the term "information storage medium" includes stationary type hard disks, removable type hard disks and card type hard disks used respectively such as so-called hard disks for personal computers and other information storage medium in the form of a disk which can be used for storage of data and can be also used in digital video cameras and digital cameras.

Aluminum alloy has been widely used as a material of a magnetic disk substrate used in a stationary type magnetic information storage device such as a hard disk of a computer. In this case, a blank substrate made of an aluminum alloy having a surface roughness Ra of about 200 Å to 1000 Å is subjected to degreasing, etching, substitution of Zn or Sn and Pd, electroless Ni—P plating, annealing, wrapping and polishing, cleaning and testing and forming of a Cr undercoat layer, a magnetic film and a protective layer to thereby form a magnetic information storage disk. Since, however, the aluminum alloy is a soft material, its Young's modulus and surface hardness are low with the result that a significant degree of vibration takes place during rotation of the disk drive at a high speed rotation which leads to deformation of the disk and hence it is difficult to cope with the requirement for making the disk thinner. Thus, the aluminum alloy cannot cope sufficiently with requirement for high-speed driving with a high recording density.

As a material for overcoming the above problems of the aluminum alloy substrate, known in the art are glass-ceramics and chemically tempered glass such as alumino-silicate glasses. Currently used glass-ceramic substrates and chemically tempered glass substrates do not have Ni—P plating on their surface as in the aluminum alloy substrates but the Cr undercoat layer and magnetic film are directly formed on the surface of the substrates. This is because Ni—P plating having excellent adhesion cannot be achieved on the surface of the glass-ceramic substrates and the chemically tempered glass substrates.

However, in the case that the Cr undercoat layer and magnetic film are formed directly on the surface of a glass-ceramic substrate or a chemically tempered glass substrate without the Ni—P plating, magnetic substance grains of the magnetic film tend to have an excessively large grain diameter as compared with a case where the Cr undercoat layer and magnetic film are formed on the Ni—P plating and this will become an obstacle to the requirement for the high density recording in the future.

Examples in which the Ni—P plating is applied to a glass-ceramic substrate or a chemically tempered glass substrate are disclosed in, for example, Japanese Patent Application Laid-open Publication No. Sho 62-230651, Japanese Patent Application Laid-open Publication No. Sho 63-225915, Japanese Patent Application Laid-open Publication No. Hei 6-87680, Japanese Patent Application Laid-open Publication No. Hei 7-272263. In these examples, chemical etching is made on the substrate in an attempt to roughen its surface and thereafter the Ni—P plating is applied to the roughened surface. Despite these efforts, however, sufficient roughening of the surface of the substrate by etching could not be achieved in most of these glass-ceramic substrates and chemically tempered glass substrates which resulted in insufficient adhesion of the Ni—P layer. In some glass-ceramic substrates, adhesion of the Ni—P layer was improved at the sacrifice of flatness of the surface and these substrates are not proper as a high recording density information storage medium required today. Thus, there is no practicable technique today by which the Ni—P plating can be sufficiently applied to glass-ceramic substrates and chemically tempered glass substrates.

As a type of a chemically tempered glass, known in the art are alumino-silicate glasses ($SiO_2$—$Al_2O_3$—$Na_2O$) disclosed in Japanese Patent Application Laid-open Publication No. Hei 8-48537 and Japanese Patent Application Laid-open Publication No. Hei 5-32431. This material, however, has the following disadvantages:

(1) Since polishing is made after the chemical tempering process, the chemically tempered layer is seriously instable in making the disk thinner. Further, the chemically tempered layer causes change with time after use for a long period of time with resulting deterioration in the magnetic property of the disk.

(2) Since the chemically tempered glass contains $Na_2O$ and $K_2O$ as its essential ingredients, the film forming property of the glass is adversely affected, and a barrier coating over the entire surface of the glass becomes necessary for preventing elution of $Na_2O$ and $K_2O$ ingredients and this prevents stable production of the product at a competitive cost.

(3) The chemical tempering is made for improving mechanical strength of the glass but this basically utilizes strengthening stress within the surface layer and the inside layer of the glass and hence its Young's modulus is about 83 GPa or below which is about equivalent to ordinary amorphous glass. Therefore, use of the glass for a disk with a high speed rotation is limited.

(4) In applying Ni—P plating, etching is made by using an HF type solution. Since etching is made uniformly over the surface of the substrate in a chemically tempered glass, a microstructure for securing adhesion of the Ni—P plating cannot be obtained with the result that a sufficient substrate for the Ni—P plating cannot be obtained. Therefore, characteristics of the glass for a high recording density information storage medium are not sufficient.

Aside from the aluminum alloy substrate and chemically tempered glass substrate, known in the art are some glass-ceramic substrates. For example, Japanese Patent Application Laid-open No. Hei 9-35234 and EP0781731A1 disclose glass-ceramic substrates for a magnetic disk made of a $Li_2O$—$SiO_2$ system composition and has crystal phases of lithium disilicate and β-spodumene, or crystal phases of lithium disilicate and β-cristobalite. In these publications, however, the relation between Young's modulus and specific gravity with respect to high speed rotation is not taken into consideration at all. Further, no suggestion is made about an HF etching technique suitable for Ni—P plating and conditions of a microstructure suitable for Ni—P plating.

Japanese Patent Application Laid-Open Publication No. Hei 9-77531 discloses a glass-ceramic of a $SiO_2$—$Al_2O_3$—MgO—ZnO—$TiO_2$ system which has Young's modulus of 93.4 GPa to 160.11 GPa and volume density of 2.83 to 3.24 and also a substrate for a high rigidity magnetic information storage disk made of this glass-ceramic. This glass-ceramic contains a large amount of Spinel crystal ((Mg or Zn) $Al_2O_4$) as its predominant crystal phase and $MgTi_2O_5$ or $Zn_2Ti_2O_5$ and several other crystals as its subordinate crystal phases. The glass-ceramic contains a large amount of $Al_2O_3$ and has a high specific gravity and a high Young's modulus.

Addition of such a large amount of $Al_2O_3$, however, is undesirable from the standpoint of production because it causes deterioration of melting property of the base glass and also deterioration of resistance to devitrification. Further, in this publication, the relation of Young's modulus (GPa)/specific gravity and the value of specific gravity per se which are necessary for the high speed rotation are not taken into consideration at all. No suggestion is made either as to an HF technique suitable for Ni—P plating and conditions of microstructure for Ni—P plating. Particularly, the specific gravity in this publication is a high value of 2.83 or over. This publication therefore merely proposes a glass-ceramic substrate made of a rigid material. Moreover, the glass-ceramic of this system has the serious disadvantage that processability is poor and therefore is not suited for a large scale production since it is too hard and hence the improvement of this glass-ceramic as a high recording density information storage medium substrate is still not sufficient.

It is, therefore, an object of the invention to eliminate the above described disadvantages of the prior art materials and provide a glass-ceramic substrate for an information storage medium capable of coping with the tendency toward a high speed driving, high recording density recording, namely having excellent adhesion to Ni—P plating.

It is another object of the invention to provide a method for manufacturing such glass-ceramic substrate.

It is another object of the invention to provide an information storage medium made by applying Ni—P plating and forming a film of an information storage medium on this glass-ceramic substrate.

SUMMARY OF THE INVENTION

Accumulated studies and experiments made by the inventor of the present invention for achieving the above described objects of the invention have resulted in the finding, which has led to the present invention, that a glass-ceramic substrate made of a glass-ceramic having a specific microstructure in the surface portion thereof exhibits an excellent adhesion characteristic in Ni—P plating.

For achieving the object of the invention, there is provided a glass-ceramic substrate for an information storage medium made of a glass-ceramic having a crystal phase dispersed in a glass matrix wherein a ratio of the crystal phase (the amount of crystal) in the glass-ceramic is within a range from 50 wt % to 70 wt % and crystal grains having an average crystal grain diameter within a range from 0.10 $\mu$m to 0.50 $\mu$m are exposed on the surface of the substrate.

In one aspect of the invention, there is provided a glass-ceramic substrate for an information storage medium made of a glass-ceramic having a crystal phase dispersed in a glass matrix wherein a ratio of Young's modulus to specific gravity is 39 GPa or over and crystal grains having an average crystal grain diameter within a range from 0.10 $\mu$m to 0.50 $\mu$m are exposed on the surface of the substrate.

In another aspect of the invention, there is provided a glass-ceramic substrate for an information storage medium made of a glass-ceramic having a crystal phase dispersed in a glass matrix wherein crystal grains having an average crystal grain diameter within a range from 0.10 $\mu$m to 0.50 $\mu$m are present in a surface portion of the substrate and the substrate has a surface microstructure in which respective crystal grains present in the surface portion of the substrate are fixed to the surface portion with half or more in volume of the respective crystal grains being exposed above the surface of the glass matrix.

In another aspect of the invention, the glass-ceramic substrate has Young's modulus within a range from 95 GPa to 160 GPa, specific gravity within a range from 2.40 to 2.80 and a ratio of Young's modulus to specific gravity within a range from 39 GPa to 57 GPa.

In another aspect of the invention, the glass-ceramic substrate is made by applying etching to a glass-ceramic and has a surface roughness Ra (arithmetic average roughness) after polishing of 500 Å or below.

In another aspect of the invention, the glass-ceramic substrate is made by applying etching to the glass-ceramic soaked in a 4 wt % to 30 wt % HF type etching solution at an etching rate of 30 Å/second or over.

In another aspect of the invention, the surface roughness (Ra) of the glass-ceramic substrate is within a range from 50 Å to 10000 Å.

In another aspect of the invention, said glass-ceramic contains, as its predominant crystal phase or phases, at least one crystal selected from the group consisting of cordierite ($Mg_2Al_4Si_5O_{18}$), cordierite solid solution ($Mg_2Al_4Si_5O_{18}$ solid solution), Spinel ((Mg or Zn)(Al or Ti)$_2O_4$), Spinel solid solution ((Mg or Zn)(Al or Ti)$_2O_4$), enstatite ($MgSiO_3$), enstatite solid solution ($MgSiO_3$ solid solution), quartz ($SiO_2$) and quartz solid solution ($SiO_2$).

In another aspect of the invention, crystal grains of the predominant crystal phase or phases of the glass-ceramic have an average crystal grain diameter within a range from 0.05 $\mu$m to 1.0 $\mu$m.

In another aspect of the invention, the glass-ceramic contains a crystal phase of cordierite having an average crystal grain diameter within a range from 0.10 $\mu$m to 1.0 $\mu$m.

In another aspect of the invention, the glass-ceramic contains a crystal phase of enstatite having an average crystal grain diameter within a range from 0.10 $\mu$m to 1.0 $\mu$m.

In another aspect of the invention, the glass-ceramic contains acicular, granular or sheet-shaped crystal grains having an average crystal grain diameter within a range from 0.10 $\mu$m to 1.0 $\mu$m.

In another aspect of the invention, a coefficient of thermal expansion within a temperature range from −50° C. to +70° C. is within a range from $30 \times 10^{-7}$/° C. to $50 \times 10^{-7}$/° C.

In another aspect of the invention, the glass-ceramic has a composition which comprises, in weight percent:

| | |
|---|---|
| $SiO_2$ | 40–60% |
| MgO | 10–18% |
| MgO + ZnO | 10–18% |
| $Al_2O_3$ | 10–less than 20% |
| $P_2O_5$ | 0–4% |
| $B_2O_3$ | 0–4% |
| CaO | 0.5–4% |
| BaO | 0–5% |
| $ZrO_2$ | 0–5% |
| $TiO_2$ | 2.5–8% |
| $Sb_2O_3$ | 0–1% |
| $As_2O_3$ | 0–1% |
| F | 0–3% |
| $Fe_2O_3$ | 0–5%. |

In another aspect of the invention, the glass-ceramic contains, as its predominant crystal phases, lithium disilicate ($Li_2O.2SiO_2$) and further contains quartz ($SiO_2$) or quarts solid solution ($SiO_2$ solid solution), or cristobalite ($SiO_2$) or cristobahte solid solution ($SiO_2$ solid solution).

In another aspect of the invention, the respective predominant crystal phases have an average crystal grain diameter within a range from 0.05 μm to 0.40 μm.

In another aspect of the invention, the glass-ceramic contains crystal grains of quarts or quarts solid solution having an average crystal grain diameter within a range from 0.15 μm to 0.4 μm and the amount of crystal of said crystal phase is within a range from 10 wt % to 70 wt %.

In another aspect of the invention, the glass-ceramic contains crystal grains of lithium disilicate having an average crystal grain diameter within a range from 0.10 μm to 0.4 μm and the amount of crystal of said crystal phase is within a range from 40 wt % to 70 wt %.

In another aspect of the invention, crystal grains of the glass-ceramic are substantially of a spherical shape.

In another aspect of the invention, a coefficient of thermal expansion within a temperature range from −50° C. to +70° C. is within a range from $70 \times 10^{-7}/°$ C. to $130 \times 10^{-7}/°$ C.

In another aspect of the invention, the glass-ceramic has a composition which comprises, in weight percent:

| | |
|---|---|
| $SiO_2$ | 70–80% |
| $Li_2O$ | 9–12% |
| $K_2O$ | 2–5% |
| MgO | 0.5–1.8% |
| ZnO | 0.2–1.8% |
| where MgO + ZnO + CuO + CoO + NiO | 0.8–1.8% |
| $P_2O_5$ | 1.5–3% |
| $ZrO_2$ | 0.5–5% |
| $Al_2O_3$_ | 2–7% |
| $Sb_2O_3 + As_2O_3$ | 0–2%. |

In another aspect of the invention, the glass-ceramic substrate for an information storage medium is formed by applying etching on the above described glass-ceramic substrate.

In another aspect of the invention, there is provided an information storage disk having a film of an information storage medium formed on the above described glass-ceramic substrate for an information storage medium.

In another aspect of the invention, the film of an information storage medium is a magnetic metal film.

In another aspect of the invention, there is provided a method for manufacturing a glass-ceramic substrate for an information storage medium comprising steps of melting glass raw materials, forming a glass and annealing the formed glass and thereafter heat treating the formed glass for crystallization under nucleation temperature within a range from 450° C. to 850° C. and crystallization temperature within a range from 740° C. to 1000° C.

In still another aspect of the invention, there is provided a method for manufacturing a glass-ceramic substrate for an information storage medium as defined in any of claims 1 to 22 comprising steps of soaking the glass-ceramic in 4 wt % to 30 wt % HF type etching solution and applying a chemical etching at an etching rate of 30 Å/second or over.

BRIEF DESCRIPTION OF THE DRAWINGS

In the accompanying drawings,

FIG. 1 is an SEM (scanning electron microscope) photograph showing Example 2 after etching by 10 wt % $NH_4F$ solution;

FIG. 2 is an SEM photograph showing Example 8 after etching by 10 wt % $NH_4F$ solution;

DETAILED DESCRIPTION OF THE INVENTION

Figure 3:
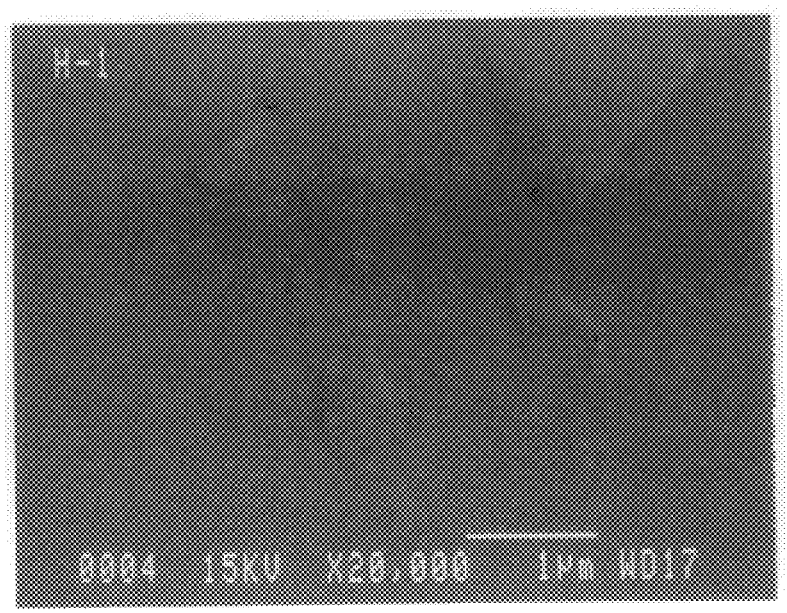
FIG. 3 is an SEM photograph showing Comparative Example 1 after etching by 10 wt % $NH_4F$ solution.

The substrate for an information storage medium according to the invention is made of a glass-ceramic in which a crystal phase is substantially uniformly dispersed in a glass matrix. A substrate for an information storage medium made of a glass-ceramic generally has a higher rigidity than a substrate for an information storage medium made of an aluminum alloy and hence vibration hardly takes place during a high speed rotation of a disk drive. For this reason, the glass-ceramic substrate is suitable for making it thin. Moreover, since the glass-ceramic substrate has a high surface rigidity, it is suitable for a high recording density recording. In the glass-ceramic of the present invention which has a preferable composition and shape, glass ingredients on the surface thereof are selectively eroded by chemical etching using an HF type solution and half or more in volume of each crystal grain present in the surface portion is exposed above the surface of the glass matrix and each grain is fixed to the glass matrix. This surface microstructure has a physical anchor effect when Ni—P plating has been applied whereby the glass-ceramic substrate according to the invention exhibits excellent adhesion with the Ni—P plating.

The glass-ceramic substrate of the present invention is characterized in that crystal grains having an average crystal grain diameter within a range from 0.1 μm to 0.5 μm are exposed on the surface of the glass-ceramic substrate. The surface of the glass-ceramic on which crystal grains having the size within this range are exposed is most suitable because it has a sufficient anchor effect in Ni—P plating.

It has been found that a glass-ceramic substrate having an average crystal grain diameter of less than 0.10 μm cannot have a sufficiently roughened surface after etching. A glass-ceramic substrate having an average crystal grain diameter exceeding 0.5 μm cannot have a sufficient anchor effect when Ni—P plating is applied after the surface of the glass-ceramic is roughened by etching.

In the glass-ceramic substrate of the invention, the amount of crystal in the glass-ceramic should preferably be 50 wt % to 70 wt %. The term "amount of crystal" herein means the ratio of crystal phase in the glass-ceramic. If the amount of crystal is below 50 wt %, a good surface characteristic suitable for Ni—P plating cannot be achieved after etching. If the amount of crystal exceeds 70%, a good surface characteristic suitable for Ni—P plating cannot be achieved after etching.

Young's modulus and specific gravity suitable for the glass-ceramic of the present invention will now be described. As described previously, there has been an increasing tendency toward driving of a magnetic information storage medium with a high-speed rotation for improving the recording density and data transfer rate. It has been found by the inventor of the present invention that, for sufficiently conforming to such tendency, a material for an information storage medium must have high rigidity and low specific gravity in order to prevent deflection and vibration caused by vibration and attenuation characteristics of the disk which occur during high speed rotation of the disk. A disk which has high rigidity but high specific gravity causes deflection during a high speed rotation with resulting vibration of the disk. Conversely, a disk which has a low specific gravity but low rigidity causes vibration likewise. It has been found that an apparently contradictory balance of physical properties of the material must be adopted, namely high rigidity and low specific gravity. A ratio of Young's modulus to specific gravity in the glass-ceramic of the present invention preferably is 39 GPa or over. A more preferable range of this ratio is 40 GPa or over and most preferable ratio is 41 GPa or over. In case cordierite constitutes the predominant crystal phase, a preferable ratio of Young's modulus to specific gravity is 45 GPa or over. In glass-ceramic substrates of the same composition, more excellent adhesion to Ni—P plating can be achieved as the ratio of Young's modulus to specific gravity increases.

From the standpoint of processability in wrapping and polishing the glass-ceramic substrate, the ratio of Young's modulus to specific gravity preferably is 57 GPa or below and, more preferably 54 GPa or below. The glass-ceramic substrate satisfying this ratio of Young's modulus to specific gravity should preferably have Young's modulus within a range from 95 GPa to 160 GPa and specific gravity within a range from 2.40 to 2.80.

As to the surface roughness Ra, the glass-ceramic substrate of the present invention preferably has a surface roughness Ra of 50 Å or over and, more preferably, 200 Å or over in order to exercise a sufficient anchor effect and thereby achieve excellent adhesion. Further polishing of the glass-ceramic after Ni—P plating is possible. For enhancing the work efficiency in such processing after Ni—P plating, the glass-ceramic substrate of the present invention preferably has a surface roughness of 10000 Å or below and, more preferably, 5000 μm or below and, most preferably, 2000 Å or below.

The glass-ceramic substrate for an information storage medium of the present invention can be obtained by applying etching on glass-ceramic in the form of a plate, preferably in the form of a disk. The surface of the glass-ceramic in the form of a plate before etching should preferably be polished to a surface roughness Ra of 500 Å or below. A surface roughness Ra exceeding 500 Å adversely affects the polished surface after Ni—P plating with the result that polishing of the glass-ceramic substrate for a long time is required which prevents a large scale production.

In one aspect of the invention, the glass-ceramic preferably contains, as its predominant crystal phase or phases, at least one crystal selected from the group consisting of cordierite ($Mg_2Al_4Si_5O_{18}$) cordierite solid solution ($Mg_2Al_4Si_5O_{18}$ solid solution), Spinel ((Mg or Zn)(Al or Ti)$_2O_4$), Spinel solid solution ((Mg or Zn)(Al or Ti)$_2O_4$), enstatite ($MgSiO_3$), enstatite solid solution ($MgSiO_3$ solid solution), β-quartz (β-$SiO_2$) and β-quartz solid solution (β-$SiO_2$). It has been found that these crystal phases have an etching characteristic (chemical characteristic) suitable for Ni—P plating, have good processability, contribute to increase in rigidity, have a relatively small crystal grain diameter and can realize a significantly lower specific gravity than other crystal phases.

In the crystal phases of the glass-ceramic, presence or absence and ratio of cordierite ($Mg_2Al_4Si_5O_{18}$), Spinel ((Mg or Zn)(Al or Ti)$_2O_4$), enstatite ($MgSiO_3$), β-quartz (β-$SiO_2$) and solid solutions of these crystals are determined by the ratio of MgO, $SiO_2$ and $Al_2O_3$ contained in the base glass.

Description will be made about the size of crystal grains of cordierite ($Mg_2Al_4Si_5O_{18}$), Spinel ((Mg or Zn)(Al or Ti)$_2O_4$), enstatite ($MgSiO_3$), β-quartz (β-$SiO_2$) and solid solutions of these crystals. From the standpoint that a surface flatness suitable for a glass-ceramic substrate for an information storage medium can be achieved, all of the predominant crystal phase or phases preferably have an average crystal grain diameter of 1.0 μm or below, more preferably 0.5 μm or below. On the other hand, from the standpoint that excellent adhesion with Ni—P plating can be achieved, at least one predominant phase preferably has an average crystal grain diameter of 0.5 μm or over and, more preferably 1.0 μm or over.

In the glass-ceramic substrate of the present invention, it is preferable for the glass-ceramic substrate to contain a cordierite or enstatite crystal phase having an average crystal grain diameter within a range from 0.10 μm to 1.0 μm in order to achieve a glass-ceramic surface which adheres sufficiently to the Ni—P plating. More preferably, the glass-ceramic contains a cordierite or enstatite crystal phase having an average crystal grain diameter within a range from 0.30 μm to 1.0 μm. The amount of crystal of the cordierite crystal phase preferably is within a range from 10 wt % to 70 wt % and, more preferably, within a range from 30 wt % to 70 wt %. The amount of crystal of the enstatite crystal phase preferably is within a range from 10 wt % and 70 wt % and, more preferably, within a range from 30 wt % to 70 wt %.

In the glass-ceramic substrate of the present invention, the glass-ceramic preferably contains acicular, granular or sheet-shaped crystal grains having an average crystal grain diameter within a range from 0.10 μm to 1.0 μm. As the acicular, granular or sheet-shaped crystal gains, cordierite ($Mg_2Al_4Si_5O_{18}$), Spinel ((Mg or Zn)(Al or Ti)$_2O_4$), enstatite ($MgSiO_3$) and β-quartz (β-$SiO_2$) can be taken for example. The term "acicular, granular or sheet-shaped" herein means that the crystal grains are not completely or substantially spherical.

Description will now be made about a preferable composition range (expressed on the oxide basis) of the glass-ceramic which constitutes the glass-ceramic substrate which contains, as its predominant crystal phase or phases, at least one crystal selected from the group consisting of cordierite ($Mg_2Al_4Si_5O_{18}$), cordierite solid solution ($Mg_2Al_4Si_5O_{18}$ solid solution), Spinel ((Mg or Zn)(Al or Ti)$_2O_4$), Spinel solid solution ((Mg or Zn)(Al or Ti)$_2O_4$), enstatite ($MgSiO_3$), enstatite solid solution ($MgSiO_3$ solid solution), β-quartz (β-$SiO_2$) and , β-quartz solid solution (β-$SiO_2$).

The $SiO_2$ ingredient is a very important ingredient in that it exercises a surface roughening effect when etching is made by an HF type solution and also in that, by heating a base glass, it forms cordierite ($Mg_2Al_4Si_5O_{18}$), cordierite solid solution ($Mg_2Al_4Si_5O_{18}$ solid solution), Spinel ((Mg or Zn)(Al or Ti)$_2O_4$), Spinel solid solution ((Mg or Zn)(Al or Ti)$_2O_4$), enstatite ($MgSiO_3$), enstatite solid solution ($MgSiO_3$ solid solution), and β-quartz (β-$SiO_2$) and β-quartz solid solution (β-$SiO_2$) as predominant crystal phases. If the amount of this ingredient is below 40%, the crystal phases grown in the glass-ceramic are instable and their texture tends to become too rough whereas if the amount of this ingredient exceeds 60%, difficulty arises in melting and forming the base glass. For the growth of the crystal phases, conditions of heat treatment are also important factors. A preferable range of this ingredient which enables a broadened heat treatment condition is 48.5–58.5%.

The MgO ingredient is a very important ingredient which, by heating a base glass, forms cordierite ($Mg_2Al_4Si_5O_{18}$), cordierite solid solution $Mg_2Al_4Si_5O_{18}$ solid solution), Spinel ((Mg or Zn)(Al or Ti)$_2$O$_4$), Spinel solid solution ((Mg or Zn)(Al or Ti)$_2$O$_4$), enstatite (MgSiO$_3$), enstatite solid solution (MgSiO$_3$ solid solution), and β-quartz (β-SiO$_2$) and β-quartz solid solution (β-SiO$_2$) as predominant crystal phases. If the amount of this ingredient is below 10%, a desired crystal cannot be obtained, the grown crystals of the obtained glass-ceramic are instable and their texture is too rough and melting property deteriorates. If the amount of this ingredient exceeds 18%, melting property and resistance to devitrification are reduced. For the same reason as in the SiO$_2$ ingredient, a preferable range of this ingredient is 13–18%. Further, for the same reason as in the MgO ingredient, a preferable range of MgO+ZnO is 10% to 18% and a more preferable range is 13% to 18%.

The Al$_2$O$_3$ ingredient is a very important ingredient which, by heating a base glass, forms cordierite (Mg$_2$Al$_4$Si$_5$O$_{18}$), cordierite solid solution (Mg$_2$Al$_4$Si$_5$O$_{18}$ solid solution), Spinel ((Mg or Zn)(Al or Ti)$_2$O$_4$), Spinel solid solution ((Mg or Zn)(Al or Ti)$_2$O$_4$), and β-quartz (β-SiO$_2$) and β-quartz solid solution (β-SiO$_2$). as predominant crystal phases. If the amount of this ingredient is below 10%, the grown crystals of the obtained glass-ceramic are instable and their texture is too rough whereas if the amount of this ingredient is 20% or over, melting property and resistance to devitrification are deteriorated and, moreover, an amount of growth of Spinel becomes excessively large with the result that hardness of the glass-ceramic becomes too high and processability in polishing and other processing thereby is significantly reduced and, further, specific gravity becomes too large with the result that, when the glass-ceramic is used as an information storage disk, vibration tends to take place during a high speed rotation. For these reasons, a preferable range of this ingredient is 12% to less than 20%, a more preferable range is 10% to 18% and most preferable range is 12% to 18%.

The P$_2$O$_5$ ingredient functions as a nucleating agent for the glass and is also effective for improving melting property of the base glass and resistance to devitrification during molding. Addition of this ingredient up to 4% will suffice for these purposes. A preferable range of this ingredient is 1–3%.

The B$_2$O$_3$ ingredient is effective for controlling viscosity during melting and forming of the base glass. Addition of this ingredient up to 4% will suffice for this purpose.

The CaO ingredient improves melting property of the glass and prevents grown crystals from becoming too rough. If the amount of this ingredient is below 0.5%, these effects cannot be obtained whereas if the amount of this ingredient exceeds 4%, the grown crystals of the glass-ceramic become too rough, the crystal phase changes and moreover chemical durability deteriorates. A preferable range of this ingredient is 1–3%.

The BaO ingredient may be added for improving melting property of the glass. Addition of this ingredient up to 5% will suffice. A preferable range of this ingredient is 1–3%.

The ZrO$_2$ and TiO$_2$ ingredients are very important ingredients which function as a nucleating agent for the glass and also are effective for making the grown crystal grains finer and improving mechanical strength and chemical durability of the material. Addition of the ZrO$_2$ ingredient up to 5% suffices for these purposes. If the amount of the TiO$_2$ ingredient is below 2.5%, these effects cannot be obtained. If the amount of the amount of the TiO$_2$ ingredient exceeds 8%, difficulty arises in melting the base glass and resistance to devitrification deteriorates. For the same reason as in SiO$_2$, a more preferable range of the total amount of the ZrO$_2$ and TiO$_2$ ingredients is 2–8%.

The Sb$_2$O$_3$ and/or As$_2$O$_3$ ingredients may be added as a refining agent in melting of the glass. Addition of each ingredient up to 1% will suffice.

The F ingredient may be added for improving melting property of the glass. Addition of this ingredient up to 3% will suffice.

The Fe$_2$O$_3$ ingredient may be added as a coloring agent or for improving sensitivity of detection of surface defects and also for improving absorption characteristic of a laser diode excited laser. Addition of this ingredient up to 5% will suffice.

In another aspect of the invention, the glass-ceramic preferably contains, as its predominant crystal phases, lithium disilicate (Li$_2$O.2SiO$_2$) and further contains a α-quartz (α-SiO$_2$) or a α-quarts solid solution (α-SiO$_2$ solid solution), or a α-cristobahte (α-SiO$_2$) or a α-cristobalite solid solution (α-SiO$_2$ solid solution). These crystal phases are advantageous in that they have a good etching characteristic (chemical characteristic) suitable for Ni—P plating, have good processability, contribute to increasing rigidity, can realize relatively low specific gravity and can achieve a very small crystal grain diameter. The respective predominant crystal phases preferably have an average crystal grain diameter within a range from 0.05 μm to 0.40 μm.

In this glass-ceramic substrate, the glass-ceramic preferably contains crystal grains of quarts or quarts solid solution having an average crystal grain diameter within a range from 0.15 μm to 0.4 μm and the amount of crystal of the quartz crystal phase preferably is within a range from 10 wt % to 70 wt % for obtaining a glass-ceramic surface having excellent adhesion to the Ni—P plating.

In this glass-ceramic substrate, it is preferable for obtaining a glass-ceramic having excellent adhesion to the Ni—P plating that the glass-ceramic contains crystal grains of lithium disilicate having an average crystal grain diameter within a range from 0.10 μm to 0.4 μm and that the amount of crystal of the lithium disilicate crystal phase is within a range from 40 wt % to 70 wt %.

In this glass-ceramic substrate, crystal grains of lithium disilicate Li$_2$O.2SiO$_2$), quartz (SiO$_2$), quarts solid solution (SiO$_2$ solid solution), cristobalite (SiO$_2$) and cristobalite solid solution (SiO$_2$ solid solution) preferably are substantially spherical.

Description will now be made about a preferable composition range (expressed on the oxide basis) of the glass-ceramic which contains, as its predominant crystal phases, lithium disilicate (Li$_2$O.2SiO$_2$) and further contains α-quartz (α-SiO$_2$) or a α-quarts solid solution (α-SiO$_2$ solid solution), or α-cristobalite (α-SiO$_2$) or α-cristobalite solid solution (α-SiO$_2$ solid solution).

The SiO$_2$ ingredient is a very important ingredient in that it exercises a surface roughening effect when etching is made by an HF type solution and also in that, by heating a base glass, it forms lithium disilicate (Li$_2$O.2SiO$_2$), α-quartz (α-SiO$_2$), a α-quarts solid solution (α-SiO$_2$ solid solution), α-cristobalite (α-SiO$_2$) and α-cristobalite solid solution (α-SiO$_2$ solid solution) as predominant crystal phases. If the amount of this ingredient is below 70%, the crystal phases grown in the glass-ceramic are instable and their texture tends to become too rough whereas if the amount of this ingredient exceeds 80%, difficulty arises in melting and forming the base glass.

The Li$_2$O ingredient is a very important ingredient which, by heating a base glass, it forms the lithium disilicate (Li$_2$O.2SiO$_2$) crystal as a predominant crystal phase. If the amount of this ingredient is below 9%, growth of this crystal becomes difficult and melting of the base glass becomes difficult whereas if the amount of this ingredient exceeds 12%, the crystal phase grown in the glass-ceramic is instable and its texture tends to become too rough and, moreover, chemical durability deteriorates.

The $K_2O$ ingredient is effective for improving the melting property of the glass and preventing the texture of the glass-ceramic from becoming too rough. If the amount of this ingredient is below 2%, these effects cannot be achieved whereas if the amount of this ingredient exceeds 5%, the texture of the glass-ceramic tends to become too rough, the crystal phase changes and chemical durability deteriorates.

The MgO and ZnO ingredients are important ingredients which affect the size and shape of crystal grains of lithium disilicate ($Li_2O.2SiO_2$), α-quartz (α-$SiO_2$), α-quarts solid solution (α-$SiO_2$ solid solution), α-cristobalite (α-$SiO_2$) and α-cristobalite solid solution (α-$SiO_2$ solid solution) as predominant crystal phases. In order to obtain a glass-ceramic in which fine spherical crystal grains are grown and which has a large ratio of Young's modulus to specific gravity, it is preferable that the glass-ceramic contains the MgO ingredient in the amount of 0.5% or over and the ZnO ingredient in the amount of 0.2% or over. An excessive amount of each of these ingredients functions to reduce the ratio of Young's modulus to specific gravity and, therefore, a preferable upper limit of these ingredients is 1.8% respectively. It has been found that there is a proper range of the total amount of MgO+ZnO+CuO+CoO+NiO and a preferable range of the total amount of these ingredients is from 0.8% to 1.8%. If the total amount of these ingredients exceeds 1.8%, the ratio of Young's modulus to specific gravity decreases.

The $P_2O_5$ ingredient is indispensable as a nucleating agent. If the amount of this ingredient is below 1.5%, forming of nucleus becomes insufficient and the texture of the grown crystal phase becomes too rough. If the amount of this ingredient exceeds 3%, the base glass becomes opaque which adversely affects a large scale production.

The $ZrO_2$ ingredient is a very important ingredient which, like $P_2O_5$ ingredient, functions as a nucleating agent for the glass and also is effective for making the grown crystal grains finer and improving mechanical strength and chemical durability of the material. If the amount of the $ZrO_2$ ingredient is below 0.5%, these effects cannot be obtained. If the amount of the amount of this ingredient exceeds 5%, difficulty arises in melting the base glass and a material such as $ZrSiO_4$ is left unmelted.

The $Al_2O_3$ ingredient is an ingredient which improves chemical durability and hardness of the glass-ceramic. If the amount of this ingredient is below 2%, these effects cannot be achieved. If the amount of this ingredient exceeds 7%, melting property and resistance to devitrification deteriorate and the grown crystal phase changes to β-spodumene ($Li_2O.Al_2O_3.4SiO_2$) which is a crystal of a low thermal expansion characteristic. Since growth of β-spodumene and β-cristobalite (β-$SiO_2$) significantly reduces a coefficient of thermal expansion of the material, excessive growth of these crystals should be avoided.

The $Sb_2O_3$ and $As_2O_3$ ingredients may be added as a refining agent. Addition of a total amount of one or both of these ingredients up to 2% will suffice.

In increasing the bit number and track density and reducing the size of the bit cell, difference in coefficient of thermal expansion between the information storage medium and the substrate significantly affects achievements of these objects. For this reason, it has been found that a coefficient of thermal expansion of the glass-ceramic within a temperature range from −50° C. to +70° C. should preferably be within a range from $30×10^{-7}$/° C. to $130×10^{-7}$/° C. In one embodiment of the glass-ceramic, a coefficient of thermal expansion of the glass-ceramic within a temperature range from −50° C. to +70° C. should preferably be within a range from $30×10^{-7}$/° C. to $50×10^{-7}$/° C. In the other embodiment of the glass-ceramic, a coefficient of thermal expansion of the glass-ceramic within a temperature range from −50° C. to +70° C. should preferably be within a range from $70×10^{-7}$/° C. to $50×130^{-7}$/° C.

The glass-ceramic substrate of the present invention can be manufactured by soaking the glass-ceramic made in the form of a plate in an etching solution. Preferable etching solutions are HF type solutions such as HF, $NH_4F$, $NH_4F.HF$ and $NH_4F.HF+HNO_3$. Concentration of the HF type etching solution preferably is 4 wt % to 30 wt % and, more preferably, 4 wt % to 10 wt %. Etching time preferably is 30 seconds to 800 seconds, more preferably, 30 seconds to 200 seconds and, most preferably, 30 seconds to 120 seconds. In a glass-ceramic substrate having a proper predominant and glass matrix, crystal grains are exposed on the surface of the substrate by applying etching on the surface of the substrate. In this case, the glass-ceramic substrate has a surface microstructure in which respective crystal grains present in the surface portion of the substrate are fixed to the glass matrix with half or more in volume of the respective crystal grains being exposed above the surface of the glass matrix. A glass-ceramic substrate having excellent adhesion to the Ni—P plating can thereby be obtained. In a glass-ceramic having an improper composition, there occurs a case where an F compound covers the entire surface of the substrate. If Ni—P plating is applied to such glass-ceramic, the Ni—P plating is separated in a post-stage heating process and therefore such glass-ceramic is not suitable as the glass-ceramic substrate for an information storage medium of the present invention.

By this etching, the surface of the glass-ceramic is roughened from the surface roughness of 3 Å to 500 Å to the surface roughness of preferably 50 Å to 10000 Å. A preferably etching rate is 30 Å/second or over. Etching rate herein means a difference between a surface roughness before etching (after polishing) and a surface roughness after etching divided by etching time. By the etching processing, the surface of the glass-ceramic exercises an anchor effect suitable for Ni—P plating and the glass-ceramic substrate of the present invention thereby has excellent adhesion to Ni—P plating.

For manufacturing the glass-ceramic substrate for a magnetic information storage medium according to the invention, the base glass having the above described composition is melted, is subjected to heat forming and/or cold forming, is heat treated for producing a crystal nucleus under a temperature within a range from 450° C. to 850° C. for about one to twelve hours, and further is heat treated for crystallization under a temperature within a range from 740° C. to 1000° C. for about one to twelve hours.

In one embodiment of the invention, a preferable nucleation temperature is 600° C. to 800° C. and, more preferably, 650° C. to 750° C. and a preferable crystallization temperature is 800° C. to 1000° C. and, more preferably, 830° C. to 980° C. In the other embodiment, a preferable nucleation temperature is 450° C. to 650° C. and, more preferably, 500° C. to 600° C. and a preferable crystallization temperature is 740° C. to 800° C. and, more preferably, 750° C. to 780° C.

The information storage disk of the present invention can be manufactured by applying Ni—P plating to the above described glass-ceramic substrate and thereafter forming a film of an information storage medium on the substrate in the same manner as in the conventional hard disk made of an aluminum alloy. As the film of an information storage medium, magnetic metal films such as a Co magnetic film and γ—$Fe_2O_3$ film can be used. For example, Ni—P plating is applied to the glass-ceramic substrate of the invention after etching, the substrate is then polished and, after applying an undercoat layer, a metal magnetic film is formed as the information storage medium and a protective layer and a lubricating layer are further formed to complete an information storage disk.

EXAMPLES

Examples of the present invention will now be described. Tables 1 to 3 show examples (No. 1 to No. 9) of compositions of the glass-ceramic substrate for an information storage medium made according to the invention and Tables 4 and 5 show, for comparison, the prior art chemically tempered alumino-silicate glass substrate (Comparative Example 1), the $Li_2O$—$SiO_2$ glass-ceramic substrates (Comparative Example 2, 5 and 6), the $SiO_2$—$Al_2O_3$—MgO—ZnO—$TiO_2$ glass-ceramic substrate (Comparative Example No. 3) and the $SiO_2$—$Al_2O_3$—MgO—ZnO glass-ceramic substrate (Comparative Example 4), together with the temperature of nucleation, temperature of crystallization, crystal phase, average crystal grain diameter, amount of crystal, Young's modulus, specific gravity, Young's modulus (GPa)/specific gravity, surface roughness (Ra) after polishing, coefficient of thermal expansion in the range from −50° C. to +70° C., HF type etching conditions, appearance of the surface after etching, surface roughness (Ra) after etching, etching rate and degree of adhesion of Ni—P plating. The β-quartz solid solution is expressed as "β-quartz SS". Amounts of the respective ingredients are expressed in weight percent.

After etching and supersonic cleaning, appearance of the glass-ceramic was observed by SEM (scanning electron microscope) and the surface roughness of the glass-ceramic was measured with AFM (atomic force microscope). In the appearance of etching, "clear" means a state in which the surface of the glass-ceramic is not covered with F compound produced by the reaction with the etching solution but crystal grains are exposed on the surface of the glass-ceramic. In the "clear" state, crystal grains having the average crystal grain diameter described in the tables were exposed on the surface of the glass-ceramics. The term "uneven etching not possible" in the tables designates the state in which the surface is uniformly flat without producing projections or depressions. The term "F compound generated" means the state in which a reaction product of an alkali ingredient and HF covers the surface of the glass-ceramic. The term "etching not possible" designates the state in which change in the glass-ceramic surface was not observed by SEM between the glass-ceramic before etching and the glass-ceramic after etching.

After Ni—P plating, rinsing with water and heat treatment, a lattice pattern tape separation test according to JISK 5400-1990 8.5.2 was conducted for 25 sample glass-ceramic pieces and the number of samples which were separated even slightly was indicated in the tables. In the tables, the term "separated" indicates samples which were already separated due to swelling or other causes after the heat treatment and could not be subjected to the separation test.

Figure 4:
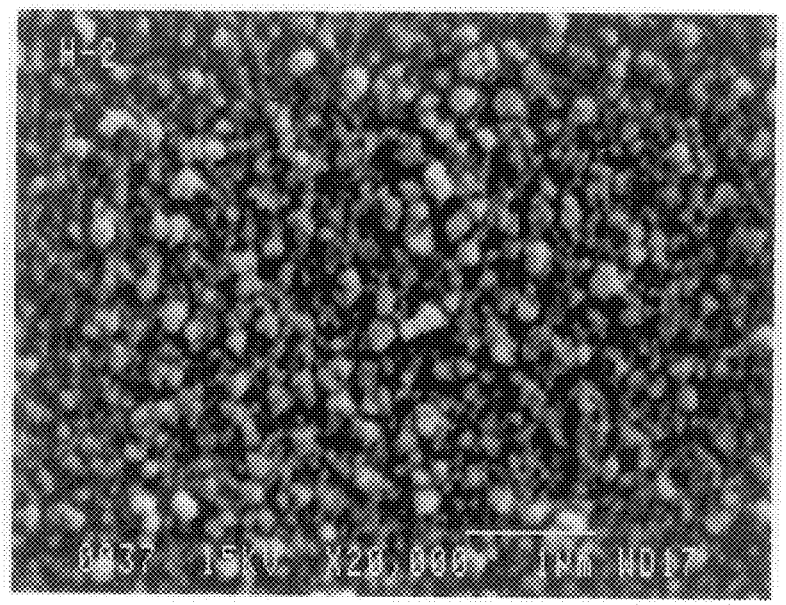
FIG. 4 is an SEM photograph showing Comparative Example 2 after etching by 10 wt % $NH_4F$ solution.
Figure 5:
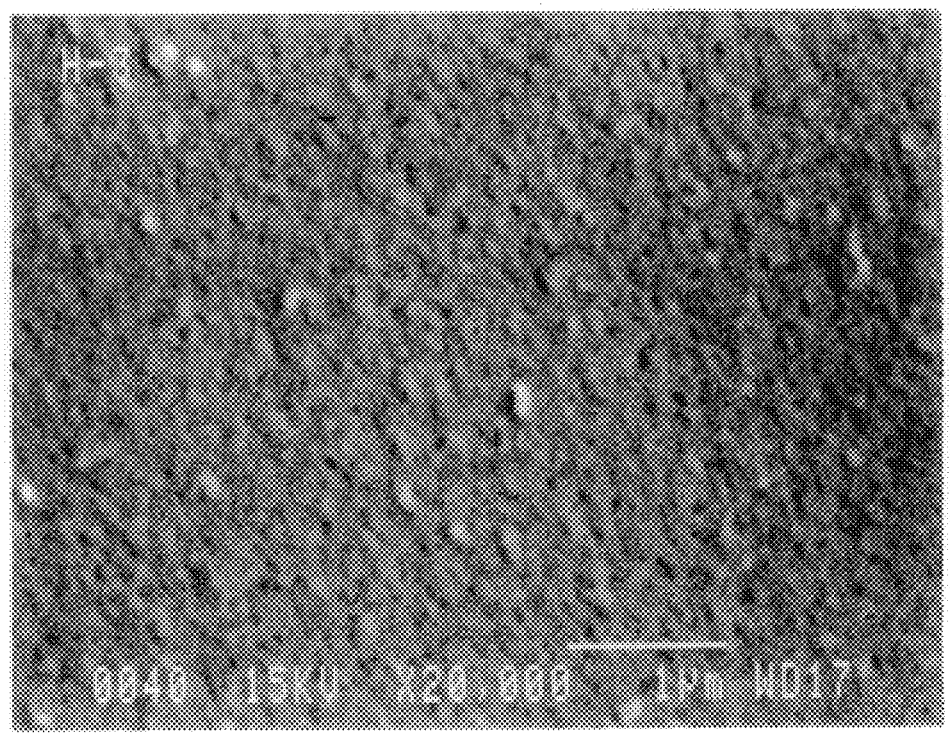
FIG. 5 is an SEM photograph showing Comparative Example 3 after etching by 10 wt % $NH_4F$ solution.

FIG. 1 is an SEM photograph of Example 2 taken after etching for 30 seconds in 10 wt % $NH_4F$ solution. FIG. 2 is an SEM photograph of Example 8 taken after etching for 30 seconds in 10 wt % $NH_4F$. FIG. 3 is an SEM photograph of Comparative Example 1 taken after etching for 30 seconds in 10 wt % $NH_4F$ solution. FIG. 4 is an SEM photograph of Comparative Example 2 taken after etching for 30 seconds in 10 wt % $NH_4$ solution. FIG. 5 is an SEM photograph of Comparative Example 3 taken after etching for 30 seconds in 10 wt % $NH_4F$ solution.

TABLE 1

| | Examples | | |
|---|---|---|---|
| | 1 | 2 | 3 |
| $SiO_2$ | 53.5 | 53.5 | 53.5 |
| MgO | 15.0 | 15.0 | 15.0 |
| $Al_2O_3$ | 18.0 | 18.0 | 18.0 |
| $P_2O_5$ | 2.0 | 2.0 | 2.0 |
| $Li_2O$ | | | |
| CaO | 2.0 | 2.0 | 2.0 |
| BaO | 2.0 | 2.0 | 2.0 |
| $TiO_2$ | 7.0 | 7.0 | 6.5 |
| $Sb_2O_3$ | | | |
| $As_2O_3$ | 0.5 | 0.5 | 0.2 |
| Other $Fe_2O_3$ | | | 0.8 |
| Nucleation temperature (° C.) | 700 | 700 | 650 |
| Crystallization temperature (° C.) | 970 | 980 | 830 |
| Crystal phases, average grain diameter, and amount of crystal of each crystal phase | cordierite ($Mg_2Al_4Si_5O_{18}$) 0.3 μm 55 wt % β-quartz SS (β-$SiO_2$ SS) 0.10 μm | cordierite ($Mg_2Al_4Si_5O_{18}$) 0.3 μm 60 wt % β-quartz SS (β-$SiO_2$ SS) 0.10 μm | enstatite ($MgSiO_3$) 0.1 μm 50 wt % |
| Amount of crystal (wt %) | 65 | 70 | 50 |
| Young's modulus (GPa) | 135 | 145 | 113 |
| Specific gravity | 2.72 | 2.80 | 2.58 |
| Young's modulus/specific gravity (GPa) | 49.6 | 51.8 | 43.8 |
| Surface roughness Ra (Å) after polishing | 5 | 500 | 3 |
| Coefficient of thermal expansion (×$10^{-7}$/° C.) (−50° C. to +70° C.) | 37 | 35 | 46 |
| Condition of etching | HF 5% 60 sec | $NH_4F$ 10% 30 sec | HF 5% 60 sec |
| Appearance of etching | clear | clear | clear |
| Surface roughness Ra (Å) after etching | 7300 | 3700 | 9000 |
| Etching rate (Å/sec) | 120 | 108 | 150 |
| Ni-P adhesion (number of separation/25) | 0/25 | 0/25 | 0/25 |

TABLE 2

| | Examples | | |
|---|---|---|---|
| | 4 | 5 | 6 |
| $SiO_2$ | 53.5 | 53.5 | 74.3 |
| MgO | 15.0 | 15.0 | 0.8 |
| $Al_2O_3$ | 18.0 | 18.0 | 7.0 |
| $P_2O_5$ | 2.0 | 2.0 | 2.0 |
| $Li_2O$ | | | 9.9 |
| CaO | 2.0 | 2.0 | ZnO = 0.5 |
| $ZrO_2$ | | 1.0 | 2.3 |
| $TiO_2$ | 7.0 | 7.0 | |
| $Sb_2O_3$ | | | 0.2 |
| $As_2O_3$ | 0.5 | 0.5 | |
| Other | BaO = 1.0 | BaO = 1.0 | $K_2O$ = 3.0 |

TABLE 2-continued

| | Examples | | |
|---|---|---|---|
| | 4 | 5 | 6 |
| $MoO_3$ | 1.0 | | |
| Nucleation temperature (° C.) | 700 | 700 | 540 |
| Crystallization temperature (° C.) | 970 | 980 | 770 |
| Crystal phases, average grain diameter, and amount of crystal of each crystal phase | cordierite $(Mg_2Al_4Si_5O_{18})$ 0.3 μm 63 wt % β-quartz SS (β-$SiO_2$ SS) 0.10 μm | cordierite $(Mg_2Al_4Si_5O_{18})$ 0.3 μm 68 wt % Spinel $(MgAl_2O_4)$ 0.10 μm | α-quartz (α-$SiO_2$) 0.15 μm 25 wt % lithium disilicate $(Li_2Si_2O_5)$ 0.10 μm |
| Amount of crystal (wt %) | 65 | 70 | 50 |
| Young's modulus (GPa) | 135 | 155 | 98 |
| Specific gravity | 2.78 | 2.80 | 2.42 |
| Young's modulus/specific gravity (GPa) | 48.6 | 55.3 | 40.5 |
| Surface roughness Ra (Å) after polishing | 65 | 200 | 5 |
| Coefficient of thermal expansion ($\times 10^{-7}$/° C.) (−50° C. to +70° C.) | 37 | 45 | 115 |
| Condition of etching | HF 5% 60 sec | $NH_4F$ 10% 30 sec | $NH_4F$ 5% 30 sec |
| Appearance of etching | clear | clear | clear |
| Surface roughness Ra (Å) after etching | 6100 | 3100 | 1200 |
| Etching rate (Å/sec) | 101 | 98 | 40 |
| Ni-P adhesion (number of separation/25) | 0/25 | 0/25 | 0/25 |

TABLE 3

| | Examples | | |
|---|---|---|---|
| | 7 | 8 | 9 |
| $SiO_2$ | 77.2 | 78.4 | 76.5 |
| MgO | 1.0 | 0.5 | 0.8 |
| $Al_2O_3$ | 3.5 | 2.5 | 3.5 |
| $P_2O_5$ | 2.0 | 2.0 | 2.3 |
| $K_2O$ | 2.6 | 3.0 | 3.8 |
| $Li_2O$ | 10.6 | 10.7 | 10.5 |
| ZnO | 0.5 | 0.5 | 0.5 |
| $ZrO_2$ | 2.4 | 2.2 | 1.9 |
| $Sb_2O_3$ | 0.2 | 0.2 | 0.2 |
| $As_2O_3$ | | | |
| Nucleation temperature (° C.) | 520 | 540 | 540 |
| Crystallization temperature (° C.) | 750 | 780 | 770 |
| Crystal phases, average grain diameter, and amount of crystal of each crystal phase | lithium disilicate $(Li_2Si_2O_5)$ 0.10 μm 55 wt % α-cristobalite (α-$SiO_2$) 0.15 μm | lithium disilicate $(Li_2Si_2O_5)$ 0.10 μm 43 wt % α-cristobalite (α-$SiO_2$) 0.15 μm | α-quartz (α-$SiO_2$) 0.15 μm 20 wt % lithium disilicate $(Li_2Si_2O_5)$ 0.10 μm |
| Amount of crystal (wt %) | 65 | 60 | 50 |
| Young's modulus (GPa) | 100 | 105 | 100 |
| Specific gravity | 2.42 | 2.41 | 2.43 |
| Young's modulus/specific gravity (GPa) | 41.3 | 43.6 | 41.2 |
| Surface roughness Ra (Å) after polishing | 65 | 200 | 5 |
| Coefficient of thermal expansion ($\times 10^{-7}$/° C.) (−50° C. to +70° C.) | 87 | 75 | 110 |
| Condition of etching | HF 5% 30 sec | $NH_4F$ 10% 30 sec | $NH_4F$ 5% 30 sec |
| Appearance of etching | clear | clear | clear |
| Surface roughness Ra (Å) after etching | 280 | 1600 | 2100 |
| Etching rate (Å/sec) | 7 | 45 | 70 |
| Ni-P adhesion (number of separation/25) | 0/25 | 0/25 | 0/25 |

TABLE 4

| | Comparative Examples | | |
|---|---|---|---|
| | 1 | 2 | 3 |
| $SiO_2$ | 62.0 | 78.5 | 43.0 |
| MgO | | | 23.0 |
| $Al_2O_3$ | 16.0 | 4.4 | 26.8 |
| $P_2O_5$ | | 2.0 | |
| $B_2O_3$ | | | |
| $Li_2O$ | 7.0 | 12.5 | |
| $Na_2O$ | 9.0 | $K_2O$ = 2.8 | $K_2O$ = 2.4 |
| $ZrO_2$ | 4.0 | | |
| $TiO_2$ | | | |
| $Sb_2O_3$ | 0.5 | 0.2 | |
| $As_2O_3$ | | | |
| Other | | | $Ga_2O_3$ = 4.8 |
| Nucleation temperature (° C.) | — | 450 | 800 |
| Crystallization temperature (° C.) | — | 850 | 950 |
| Crystal phases, average grain diameter, and amount of crystal of each crystal phase | | α-cristobalite (α-$SiO_2$) 0.30 μm 20 wt % lithium disilicate $(Li_2Si_2O_5)$ 0.10 μm | Spinel $(MgAl_2O_4)$ 0.10 μm 75 wt % |
| Amount of crystal (wt %) | 0 | 45 | 75 |
| Young's modulus (GPa) | 82 | 92 | 110.5 |
| Specific gravity | 2.54 | 2.51 | 3.24 |
| Young's modulus/specific gravity (GPa) | 32.3 | 36.0 | 34.1 |
| Surface roughness Ra (Å) after polishing | 8 | 11 | 65 |
| Coefficient of thermal expansion ($\times 10^{-7}$/° C.) (−50° C. to +70° C.) | 70 | 61 | 53 |
| Condition of etching | $NH_4F$ 10% 30 sec | $NH_4F$ 10% 30 sec | $NH_4F$ 10% 30 sec |
| Appearance of etching | uneven etching not poosible | F compound generated | etching not poosible |
| Surface roughness Ra (Å) after etching | 370 | 460 | 150 |
| Etching rate (Å/sec) | 12 | 15 | 2.8 |
| Ni-P adhesion (number of separation/25) | 25/25 | separated | 25/25 |

TABLE 5

| | Comparative Examples | | |
|---|---|---|---|
| | 4 | 5 | 6 |
| $SiO_2$ | 55.0 | 75.8 | 76.0 |
| MgO | 10.0 | 2.0 | 1.0 |
| $Al_2O_3$ | 10.0 | 2.5 | 2.8 |
| $P_2O_5$ | | 2.5 | 2.5 |
| ZnO | 10.0 | 0.5 | 0.5 |
| $Li_2O$ | | 10.0 | 10.5 |
| $ZrO_2$ | | 1.5 | 1.5 |
| $Sb_2O_3$ | $As_2O_3$ = 0.3 | 0.2 | 0.2 |
| Other | $Na_2O$ = 3.0 | $K_2O$ = 3.2 | $K_2O$ = 4.0 |
| | CaO = 3.0 | $V_2O_5$ = 0.6 | $V_2O_5$ = 0.1 |
| | $TiO_2$ = 3.7 | $MnO_2$ = 0.6 | $MnO_2$ = 0.1 |
| | BaO = 5.0 | CuO = 0.6 | NiO = 0.8 |
| Nucleation temperature (° C.) | 720 | 540 | 520 |
| Crystallization temperature (° C.) | 880 | 700 | 720 |
| Crystal phases, average grain diameter, and amount of crystal of each crystal phase | gahnite ($ZnAl_2O_4$) 0.05 μm 40 wt % | lithium disilicatge ($Li_2Si_2O_5$) 0.10 μm 30 wt % | α-quartz (α-$SiO_2$) 0.30 μm 5 wt % lithium disilicate ($Li_2Si_2O_5$) 0.10 μm |
| Amount of crystal (wt %) | 40 | 30 | 40 |
| Young's modulus (GPa) | 120 | 90 | 85 |
| Specific gravity | 3.05 | 2.50 | 2.53 |
| Young's modulus/specific gravity (GPa) | 39.3 | 36.0 | 33.6 |
| Surface roughness Ra (Å) after polishing | 5 | 4 | 3 |
| Coefficient of thermal expansion (×$10^{-7}$/° C.) (−50° C. to +70° C.) | 55 | 60 | 71 |
| Condition of etching | HF 5% 60 sec | HF 5% 60 sec | HF 5% 60 sec |
| Appearance of etching | clear | clear | clear |
| Surface roughness Ra (Å) after etching | 75 | 18 | 50 |
| Etching rate (Å/sec) | 1.2 | 0.2 | 0.8 |
| Ni-P adhesion (number of separation/25) | 25/25 | 25/25 | 25/25 |

For manufacturing the glass-ceramic substrate of the above described Examples 1 to 9 and Comparative Examples 2 to 6, materials including oxides, carbonates and nitrates were weighed and mixed and molten in a conventional melting apparatus at a temperature within the range from about 1350° C. to about 1500° C. The molten glass was stirred to homogenize it and thereafter formed into a disk shape and annealed to provide a formed glass. Then, this formed glass was subjected to heat treatment to produce the crystal nucleus under a temperature within the range from 450° C. to 850° C. for about one to twelve hours and then was subjected to a further heat treatment for crystallization under a temperature within the range from 700° C. to 1000° C. for about one to twelve hours to produce the desired glass-ceramic. Then, this glass-ceramic was lapped with lapping grains having average grain diameter ranging from 5 μm to 30 μm for about 10 minutes to 60 minutes and then was finally polished with cerium oxide having average grain diameter ranging from 0.1 μm to 2 μm for about 30 minutes to 60 minutes. The surface roughness of the polished surface was measured by AFM and shown in the tables as the surface roughness Ra.

Then, the glass-ceramic in the form of a disk after polishing was degreased with alkali (e.g., KOH) aqueous solution of about 75° C. and rinsed with water and thereafter etching was applied to the glass-ceramic under the room temperature and under the conditions described in the tables. After supersonic rinsing and imparting of catalyst, electroless Ni—P plating was applied at 86° C. and thereafter the glass-ceramic was heat treated at 230° C.

The chemically tempered glass substrate of Comparative Example 1 was likewise subjected to polishing, etching and Ni—P plating and used as a comparative sample.

The glass-ceramic substrate of Examples 1 to 9 of the present invention consists of a glass-ceramic in which a crystal phase is uniformly dispersed in a glass matrix and crystal grains having an average crystal grain diameter within a range from 0.10 μm to 0.50 μm are exposed on the surface of the substrate. Respective crystal grains present in the surface portion of the substrate are fixed to the glass matrix with half or more in volume of the respective crystal grains being exposed above the surface of the glass matrix.

As will be understood from FIGS. 1 and 2 which show typical examples, the cordierite and enstatite crystals which are predominant crystal phases of the glass-ceramics of Examples 1 to 5 are acicular, granular or sheet-shaped and the lithium disilicate, α-quarts and α-cristobalite crystals which are predominant crystal phases of the glass-ceramics of Examples 6 to 9 are substantially spherical. The glass-ceramic substrate of the present invention has been found to have a glass composition, crystals, average crystal grain diameter and amount of crystal which are suitable for etching indispensable for Ni—P plating and exhibit excellent adhesion to the Ni—P plating. In Examples 1 to 9, glass-ceramic in the form of a disk after polishing and before etching has a surface roughness Ra ranging from 3 Å to 500 Å but excellent Ni—P plating cannot be achieved.

In contrast, in Comparative Examples 1 to 6 consisting of the conventional alumino-silicate chemically tempered glass and $Li_2O$—$SiO_2$. glass-ceramics, as will be understood from FIGS. 3 to 5, a surface microstructure suitable for Ni—P plating cannot be realized in the surface portion of the glass-ceramics by etching, showing that adhesion to the Ni—P plating is very poor.

Comparative Example 1 which is made of the aluminosilicate chemically tempered glass is hardly roughened by etching. Comparative Example 2 has a surface covered with F compound and good Ni—P plating cannot be applied. Comparative Example 3 contains a large amount of $Al_2O_3$, has a high specific gravity and high Young's modulus and a desired surface roughness cannot be achieved by etching. Comparative Example 3 is different from the glass-ceramic of the present invention which contains a relatively low amount of $Al_2O_3$ and has high Young's modulus and low specific gravity characteristics. In Comparative Examples 4 to 6 also, no excellent adhesion to Ni—P plating can be achieved.

As described in the foregoing, according to the present invention, the disadvantages in the prior art are eliminated and there is provided a high rigidity glass-ceramic substrate for an information storage medium having an etching characteristic suitable for Ni—P plating which is important for a high density recording in future, having excellent flatness of the substrate surface suitable for a high recording density contact recording, and having high Young's modulus, low specific gravity and high ratio of Young's modulus to specific gravity suitable for a high speed rotation disk drive. According to the invention, there is also provided a method for manufacturing this glass-ceramic substrate.

By forming Ni—P plating layer and a magnetic film on the glass-ceramic substrate of the present invention, there is provided an information storage disk in which grains of magnetic substance can be made finer and a magnetic film can be made thinner and magnetic characteristics thereby can be improved, which is suitable for near contact recording in which a magnetic head operates in a closer distance from the disk surface in accordance with reduction in the bit cell and also suitable for contact recording and thereby contributes to a high speed and high density recording, and which is suitable not only for a stationary type hard disk such as one of a personal computer but also for high capacity, high recording density information storage devices including removable type hard disks, card type hard disks, data storage, digital video cameras and digital cameras.

What is claimed is:

1. A glass-ceramic substrate for an information storage medium made of a glass-ceramic having a crystal phase dispersed in a glass matrix wherein a ratio of the crystal phase (the amount of crystal) in the glass-ceramic is within a range from 50 wt % to 70 wt % and said glass-ceramic substrate has a microstructure in the surface portion thereof exhibiting excellent adhesion Ni—P plating, said microstructure being comprised of crystal grains having an average crystal grain diameter within a range from 0.10 μm to 0.50 μm and being exposed above the glass matrix on the surface of the substrate, said glass-ceramic containing less than 20% by weight of aluminum oxide, wherein said glass-ceramic contains, as its predominant crystal phase or phases at least one crystal selected from the group consisting of cordierite ($Mg_2Al_4Si_5O_{18}$), cordierite solid solution ($Mg_2Al_4Si_5O_{18}$) solid solution), Spinel ((Mg or Zn) (Al or Ti)$_2O_4$, Spinel solid solution ((Mg or Zn) (Al or Ti)$_2O_4$), enstatite ($MgSiO_3$), enstatite solid solution ($MgSiO_3$ solid solution), quartz ($SiO_2$) and quartz solid solution ($SiO_2$), and wherein the glass ceramic has a composition which comprises, in weight percent:

| | |
|---|---|
| $SiO_2$ | 40–60% |
| MgO | 10–18% |
| MgO + ZnO | 10–18% |
| $Al_2O_3$ | 10–less than 20% |
| CaO | 0.5–4% |
| $TiO_2$ | 2.5–8%. |

2. A glass-ceramic substrate for an information storage medium made of a glass-ceramic having a crystal phase dispersed in a glass matrix wherein a ratio of Young's modulus to specific gravity is 39 GPa or over and said glass-ceramic substrate has a microstructure in the surface portion thereof exhibiting excellent adhesion to Ni—P plating, said microstructure being comprised of crystal grains having an average crystal grain diameter with a range from 0.10 μm to 0.50 μm and being exposed above the glass matrix on the surface of the substrate, said glass-ceramic containing less than 20% by weight of aluminum oxide, wherein said glass-ceramic contains, as its predominant crystal phase or phases at least one crystal selected from the group consisting of cordierite ($Mg_2Al_4Si_5O_{18}$), cordierite solid solution ($Mg_2Al_4Si_5O_{18}$) solid solution), Spinel ((Mg or Zn) (Al or Ti)$_2O_4$), Spinel solid solution ((Mg or Zn) (Al or Ti)$_2O_4$), enstatite ($MgSiO_3$), enstatite solid solution ($MgSiO_3$ solid solution), quartz ($SiO_2$) and quartz solid solution ($SiO_2$), and wherein the glass ceramic has a composition which comprises, in weight percent:

| | |
|---|---|
| $SiO_2$ | 40–60% |
| MgO | 10–18% |
| MgO + ZnO | 10–18% |
| $Al_2O_3$ | 10–less than 20% |
| CaO | 0.5–4% |
| $TiO_2$ | 2.5–8%. |

3. A glass-ceramic substrate for an information storage medium made of a glass-ceramic having a crystal phase dispersed in a glass matrix wherein said glass-ceramic substrate has a microstructure in the surface portion thereof exhibiting excellent adhesion to Ni—P plating, said microstructure being comprised of crystal grains having an average crystal grain diameter within a range from 0.10 μm to 0.50 μm being present in a surface portion of the substrate and the substrate has a surface microstructure in which respective crystal grains present in the surface portion of the substrate are fixed to the surface portion with half or more in volume of the respective crystal grains being exposed above the surface of the glass matrix, said glass-ceramic containing less than 20% by weight of aluminum oxide, wherein said glass-ceramic contains, as its predominant crystal phase or phases at least one crystal selected from the group consisting of cordierite ($Mg_2Al_4Si_5O_{18}$), cordierite solid solution ($Mg_2Al_4Si_5O_{18}$, solid solution), Spinel ((Mg or Zn) (Al or Ti)$_2O_4$), Spinel solid solution ((Mg or Zn) (Al or Ti)$_2O_4$), enstatite ($MgSiO_3$), enstatite solid solution ($MgSiO_3$ solid solution), quartz ($SiO_2$) and quartz solid solution ($SiO_2$), and wherein the glass ceramic has a composition which comprises, in weight percent:

| | |
|---|---|
| $SiO_2$ | 40–60% |
| MgO | 10–18% |
| MgO + ZnO | 10–18% |
| $Al_2O_3$ | 10–less than 20% |
| CaO | 0.5–4% |
| $TiO_2$ | 2.5–8%. |

4. A glass-ceramic substrate for an information storage medium as defined in claim 1 having Young's modulus within a range from 95 GPa to 16 GPa, specific gravity within a range from 2.40 to 2.80 and a ratio of Young's modulus to specific gravity within a range from 39 GPa to 57 GPa.

5. A glass-ceramic substrate for an information storage medium as defined in claim 1 made by applying etching to a glass-ceramic having a surface roughness Ra (arithmetic average roughness) after polishing of 500 Å or below.

6. A glass-ceramic substrate for an information storage medium as defined in claim 1 made by applying etching to the glass-ceramic soaked in a 4 wt % to 30 wt % HF etching solution at an etching rate of 30 Å/second or over.

7. A glass-ceramic substrate for an information storage medium as defined in claim 5 wherein the surface roughness (Ra) after etching is within a range from 50 Å to 1000 Å.

8. A glass-ceramic substrate for an information storage medium as defined in claim 1 wherein a coefficient of thermal expansion within a temperature range from −50° C. to +70° C. is within a range from $30 \times 10^{-7}$/°C. to $50 \times 10^{-7}$/°C.

9. A glass-ceramic substrate for an information storage medium as defined in claim 1 wherein the glass-ceramic has a composition which comprises, in weight percent:

|  |  |
|---|---|
| SiO$_2$ | 40–60% |
| MgO | 10–18% |
| MgO + ZnO | 10–18% |
| Al$_2$O$_3$ | 10–less than 20% |
| P$_2$O$_5$ | 0–4% |
| B$_2$O$_3$ | 0–4% |
| CaO | 0.5–4% |
| BaO | 0–5% |
| ZrO$_2$ | 0–5% |
| TiO$_2$ | 2.5–8% |
| Sb$_2$O$_3$ | 0–1% |
| As$_2$O$_3$ | 0–1% |
| F | 0–3% |
| Fe$_2$O$_3$ | 0–5%. |

\* \* \* \* \*